(12) United States Patent
Takahashi et al.

(10) Patent No.: US 7,201,939 B2
(45) Date of Patent: Apr. 10, 2007

(54) OPTICAL FIBER WITH ANTIREFLECTION COATING, AND METHOD FOR MANUFACTURING THE SAME

(75) Inventors: Takashi Takahashi, Tokyo (JP); Masakazu Komine, Tokyo (JP); Kazumii Kokubo, Tokyo (JP); You Umeda, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 122 days.

(21) Appl. No.: 10/623,154

(22) Filed: Jul. 21, 2003

(65) Prior Publication Data

US 2005/0079285 A1  Apr. 14, 2005

(30) Foreign Application Priority Data

Aug. 7, 2002  (JP) ............... 2002-229627

(51) Int. Cl.
  *B05D 5/06* (2006.01)
  *C03C 25/10* (2006.01)
(52) U.S. Cl. ............... 427/163.2; 427/163.4; 427/430.1; 427/443.2; 65/430; 65/432
(58) Field of Classification Search ............... 428/392; 427/117, 163.2, 430.1, 443.2, 163.4; 65/430, 65/432
  See application file for complete search history.

(56) References Cited

U.S. PATENT DOCUMENTS

| | | | |
|---|---|---|---|
| 4,671,609 A * | 6/1987 | Khoe et al. ............... | 385/33 |
| 5,116,644 A | 5/1992 | Asai et al. | |
| 5,995,696 A * | 11/1999 | Miyagi et al. ............... | 385/125 |
| 6,174,424 B1 * | 1/2001 | Wach et al. ............... | 205/73 |
| 6,805,903 B2 * | 10/2004 | Yoshida ............... | 427/166 |
| 2004/0091011 A1 * | 5/2004 | Liu ............... | 372/46 |
| 2005/0136180 A1 * | 6/2005 | Pellerite et al. ............. | 427/162 |
| 2005/0214453 A1 * | 9/2005 | Kawanishi ............... | 427/163.2 |

FOREIGN PATENT DOCUMENTS

| | | |
|---|---|---|
| JP | 58-2236939 A | 12/1983 |
| JP | 60-068319 A | 4/1985 |
| JP | 63-038905 A | 2/1988 |
| JP | 1-312501 A | 12/1989 |
| JP | 2-019801 A | 1/1990 |
| JP | 6-085011 B2 | 10/1994 |
| JP | 7-157338 A | 6/1995 |
| JP | 7-294706 A | 11/1995 |
| JP | 7-119842 B2 | 12/1995 |
| JP | 2001-305302 A | 10/2001 |
| JP | 2002-107502 A | 4/2002 |

* cited by examiner

*Primary Examiner*—Jill Gray
(74) *Attorney, Agent, or Firm*—Foley & Lardner LLP

(57) ABSTRACT

An optical member (for example, optical fiber) is dipped in a coating solution having a film forming material dissolved therein to form an antireflection film on the end surface of the optical member. When the optical member is pulled up from the coating solution, the angle formed by the level of the coating solution and the end surface of the optical member, or the pulling speed is varied to adjust the film thickness or reflectance of the antireflection film to be formed on the end surface of the optical member. The film forming material is a fluorine-containing compound. The antireflection film is formed by dipping. The film thickness of the antireflection film is uneven.

3 Claims, 4 Drawing Sheets

(A)

(B)

(C)

Formed antireflection film

CYTOP CTX-100 Series

Examples with pulling speed of 6 cm/min

OPTICAL FIBER WITH ANTIREFLECTION COATING, AND METHOD FOR MANUFACTURING THE SAME

BACKGROUND OF THE INVENTION

1. Field of the Invention

The present invention relates to a method for forming an antireflection coating or film (referred also to as AR coat) on the end surface of an optical fiber, and an optical fiber manufactured according to this method.

2. Related Art

Conventionally, it is well known to form an antireflection coating or film on an optical lens, a spectacle lens, a panel for display equipment, or the like by dipping method (referred also to as immersion coating method or dip coating method), for example, as shown in Japanese Patent Laid-Open No. 60-68319, Japanese Patent Laid-Open No. 63-38905, Japanese Patent Laid-Open No. 1-312501, Japanese Patent Laid-Open No. 2-19801, Japanese Patent Laid-Open No. 7-294706, Japanese Patent Publication No. 7-119842, Japanese Patent Laid-Open No. 2001-305302 and Japanese Patent Laid-Open No. 2002-107502.

Particularly, as shown in Japanese Patent Laid-Open No. 7-294706, a transparent fluororesin soluble to solvent (for example, "CYTOP" produced by ASAHI GLASS CO., LTD.) has been developed as the material of a fluororesin thin film for forming the antireflection film, and it is dissolved to a fluorine-based solvent followed by dip coating, whereby a thin film can be formed. In case of the dip coating, a desired film thickness can be obtained by controlling the concentration of the fluorine resin solution and the pulling speed.

Further, for example, as shown in Japanese Patent Laid-Open No. 58-223639, Japanese Patent Laid-Open No. 7-157338, Japanese Patent Publication No. 6-85011, the technique of applying an antireflection film to the end surface of an optical fiber by subjecting the end surface to sputtering treatment or vacuum evaporation has been also widely known.

However, technique of forming the antireflection film on the end surface of optical fiber by the above dipping method is not known, and in the dipping method disclosed in Japanese Patent Laid-Open No. 7-294706, the concrete correlation between the concentration of the fluorine resin solution and the pulling speed is not described, and the execution of this method had to rely on the feel and experience of a skilled worker.

Further, the sputtering treatment or vacuum evaporation requires a large film forming device, which leads to an extremely high manufacturing cost. Therefore, a method capable of forming the film at a low cost and an optical fiber manufactured by use of this method have been desired for a long time.

SUMMARY OF THE INVENTION

The present invention has an object to provide an antireflection film forming method for optical surface end surface of an optical fiber allowing even a beginner to easily form an antireflection film at a low cost, and an optical fiber manufactured according to this method.

Modes of embodying the present invention will be explained.

(1) An antireflection film forming method for optical fiber comprises a step of dipping an optical fiber in a coating solution having a film forming material dissolved therein; and a step of forming an antireflection film on the end surface of the optical fiber.

(2) The antireflection film forming method for optical fiber, wherein the pulling speed is changed, when the optical fiber is pulled up from the coating solution, to adjust the reflection reducing wavelength band of the antireflection film to be formed on the end surface of the optical fiber.

(3) The antireflection film forming method for optical fiber, wherein the pulling speed is changed, when the optical fiber is pulled up from the coating solution, to adjust the reflectance of the antireflection film to be formed on the end surface of the optical fiber.

(4) The antireflection film forming method for optical fiber, wherein the film forming material is a fluorine-containing compound.

(5) The antireflection film forming method for optical fiber, wherein the angle of the end surface of the optical fiber to the level of the coating solution is changed, when the optical fiber is pulled up from the coating solution, to adjust the reflection reducing wavelength band of the antireflection film to be formed on the end surface of the optical fiber.

(6) The antireflection film forming method for optical fiber, wherein the angle of the end surface of the optical fiber to the level of the coating solution is changed, when the optical fiber is pulled up from the coating solution, to adjust the reflectance of the antireflection film to be formed on the end surface of the optical fiber.

(7) An optical fiber having an antireflection film formed on the end surface, wherein the antireflection film is formed by dipping.

(8) The optical fiber, wherein the film forming material is a fluorine-containing compound.

(9) The optical fiber, wherein the film thickness of the antireflection film is uneven.

(10) The optical fiber, wherein the film thickness of the antireflection film is even.

According to the present invention, an antireflection film forming method for optical surface end surface of an optical fiber allows even a beginner to easily form an antireflection film at a low cost. An optical fiber manufactured according to this method is provided.

The present invention relates to improvements in the optical fiber having an antireflection film formed on the end surface and the antireflection film forming method for optical fiber.

The end surface of the optical fiber is dipped in a coating solution having a film forming material dissolved therein, and the optical fiber is then pulled up from the coating solution. The pulling speed in the pulling is changed to control the film thickness or surface shape to a desired one, and the antireflection film is formed. Particularly, the reflection reducing wavelength band or reflectance is adjusted to a desired one.

The film forming material is preferably a fluorine-containing compound.

When the optical fiber is pulled up, the end surface of the optical fiber is preferably inclined at a prescribed angle to the level of the coating solution to precisely ensure the desired reflection reducing wavelength band (or desired film thickness) and reflectance, thereby forming an antireflection film.

It is preferable to form the antireflection film on the end surface of the optical filter by dipping method. Particularly, at least the vicinity of the end surface of the optical fiber is dipped in a solvent having the film forming material dissolved therein, and then pulled up from the coating solution. At that time, the pulling speed is preferably changed to a prescribed value to precisely ensure the desired reflection reducing wavelength band (or desired film thickness) and reflectance, thereby forming an antireflection film.

The angular inclination between the level of the coating solution and the end surface of the optical fiber is preferably set to, for example, an angle larger than 0° to an angle of 90°.

According to the present invention, since the end surface of the optical fiber can be inclined at a prescribed angle to the level of the coating solution and pulled up at a prescribed speed, an antireflection film having desired thickness and reflectance can be easily formed on the end surface of the optical fiber at a low cost. The present invention further has the effect that the film thickness, reflectance and the like can be precisely controlled.

BRIEF DESCRIPTION OF THE DRAWINGS

Preferred embodiments of the present invention will be described with reference to the drawings, wherein.

DESCRIPTION OF THE PREFERRED EMBODIMENTS

A typical example of an optical fiber according to the present invention is an optical fiber 1 made of quartz, acryl or the like. Such an optical fiber is used, for example, in laser treatment equipment, a survey machine, other fiber arrays, an optical waveguide, or the like.

Figure 1A:
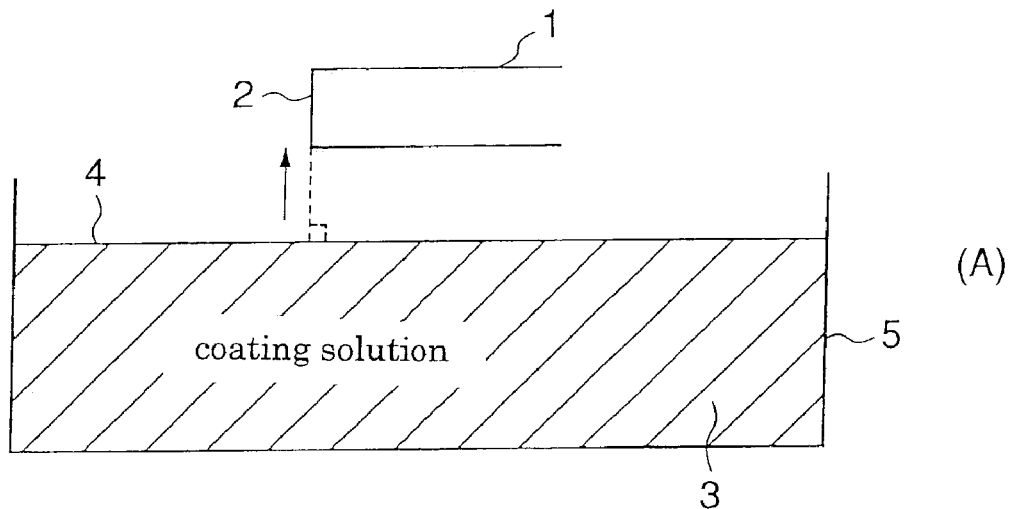
FIGS. 1A, 1B and 1C show various angular relations between the end surface of an optical fiber and the level of a coating solution in the execution of the method according to the present invention.
Figure 1B:
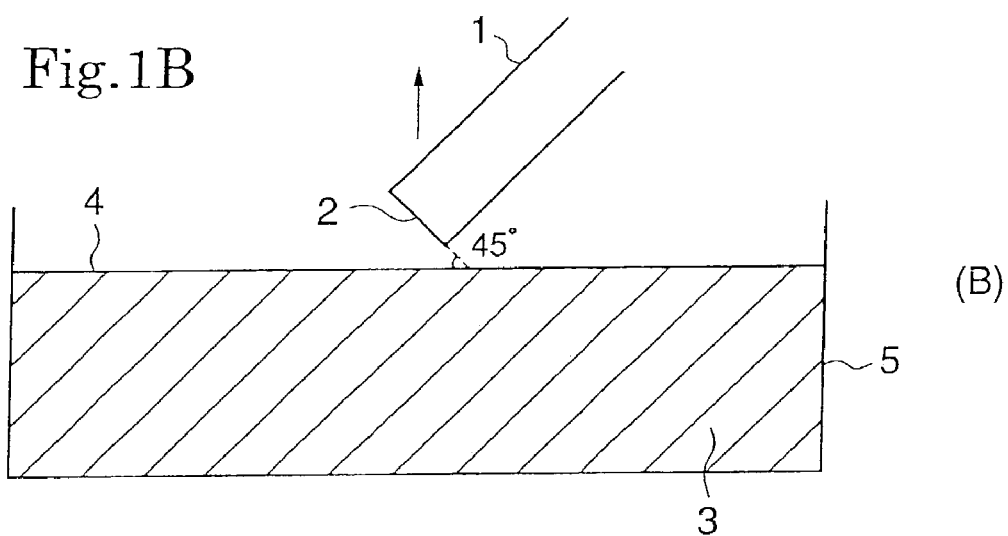
Figure 1C:
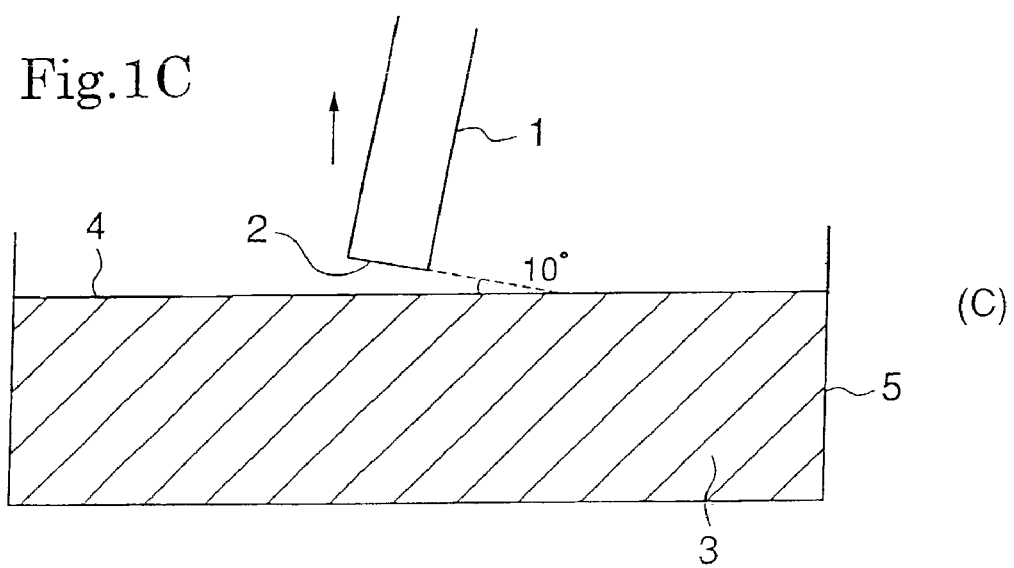

An end surface 2 of the optical fiber 1 is dipped in a coating solution 3 in a vessel 5 for a prescribed time, as shown in FIGS. 1A–1C, by a pulling device (not shown), and then gradually pulled up while keeping the state where it is inclined at a prescribed angle, for example, 90° (FIG. 1A), 45° (FIG. 1B), or 10° (FIG. 1C), to a level 4 of the coating solution 3.

The inclination may be set to an angle ranging from an angle larger than 0° to an angle of 90° without being limited to these angles of 10°, 45°, and 90°, or to other angles. For example, the inclination may be 30°.

Figure 2:
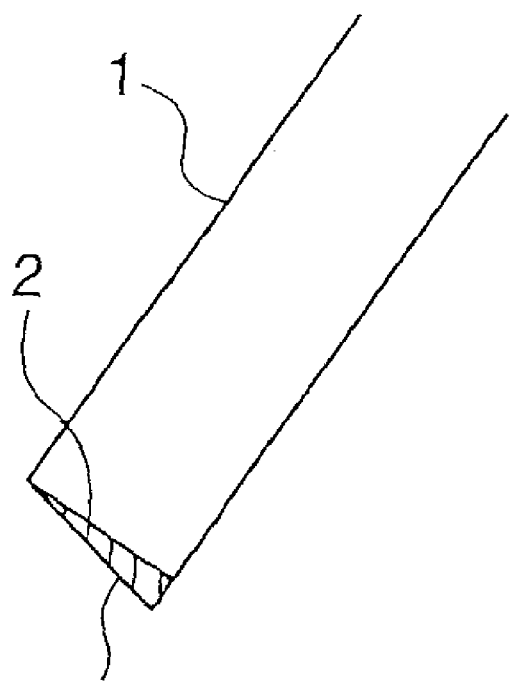
FIG. 2 shows an antireflection film formed on the end surface of an optical fiber according to the method of the present invention.

According to this, as shown in FIG. 2, the film thickness of the antireflection film to be formed on the end surface of the optical fiber can be gradated from a thin part to a thick part.

The coating solution 3 is preferably a mixed solvent of 90–99% of an organic solvent having a boiling point of 100° C. to 1–10% of the stock solution of a fluorine-based compound such as a soluble fluororesin produced by ASAHI GLASS CO., LTD. (which also contains a diluent).

The concentration, composition and the like of the coating solution are not limited to the above embodiment, and any concentrations and compositions may be adapted.

As the stock solution of the coating solution, fluororesins produced by AUSIMONT K.K. and DU PONT FLUORO-CHEMICAL CO., LTD. can be used, in addition to CYTOP (brand name, produced by ASAHI GLASS CO., LTD.) that is a heat setting type fluorine-based compound of fluorine-containing compounds.

Further, an ultraviolet curing fluorine acrylic resin, an ultraviolet curing fluorine epoxy resin, a heat setting type sol-gel fluorine silicon compound, and a fluorine-containing compound that is a sol-gel material can be also used.

Further, as an example of the silicon-based compound of the fluorine-containing compounds, fluoroalkyl silane is also usable.

Examples of it are as follows:
$CF_3CH_2CH_2Si(OMe)_3$,
$CF_3(CF_2)_5CH_2CH_2Si(OMe)_3$,
$CF_3(CF_2)_7CH_2CH_2Si(OMe)_3$,
$CF_3(CF_2)_7CH_2CH_2SiMe(OMe)_3$,
$CF_3CH_2CH_2SiCl_3$,
$CF_3CH_2CH_2Si(OMe)_3$,
$CF_3(CF_2)_5CH_2CH_2SiCl_3$,
$CF_3(CF_2)_5CH_2C_2Si(OMe)_3$,
$CF_3(CF_2)_7CH_2CH_2SiCl_3$,
$CF_3(CF_2)_7CH_2CH_2Si(OMe)_3$,
$CF_3(CF_2)_7CH_2CH_2SiMeCl_2$,
$CF_3(CF_2)_7CH_2CH_2SiMe(OMe)_2$ When the end surface 2 of the optical fiber 1 is pulled up from the coating solution 3, the suitable pulling speed is about several mm/min–200 mm/min. Particularly, the antireflection film (AR coat) is preferably formed on the end surface 2 of the optical fiber 1 at a pulling speed of 20.0 mm/min so as to have a film thickness of 0.1 µm. Further, the antireflection film is preferably formed at a pulling speed of 4.0 mm/min so as to have a film thickness of 0.1 µm or less.

Figure 3:
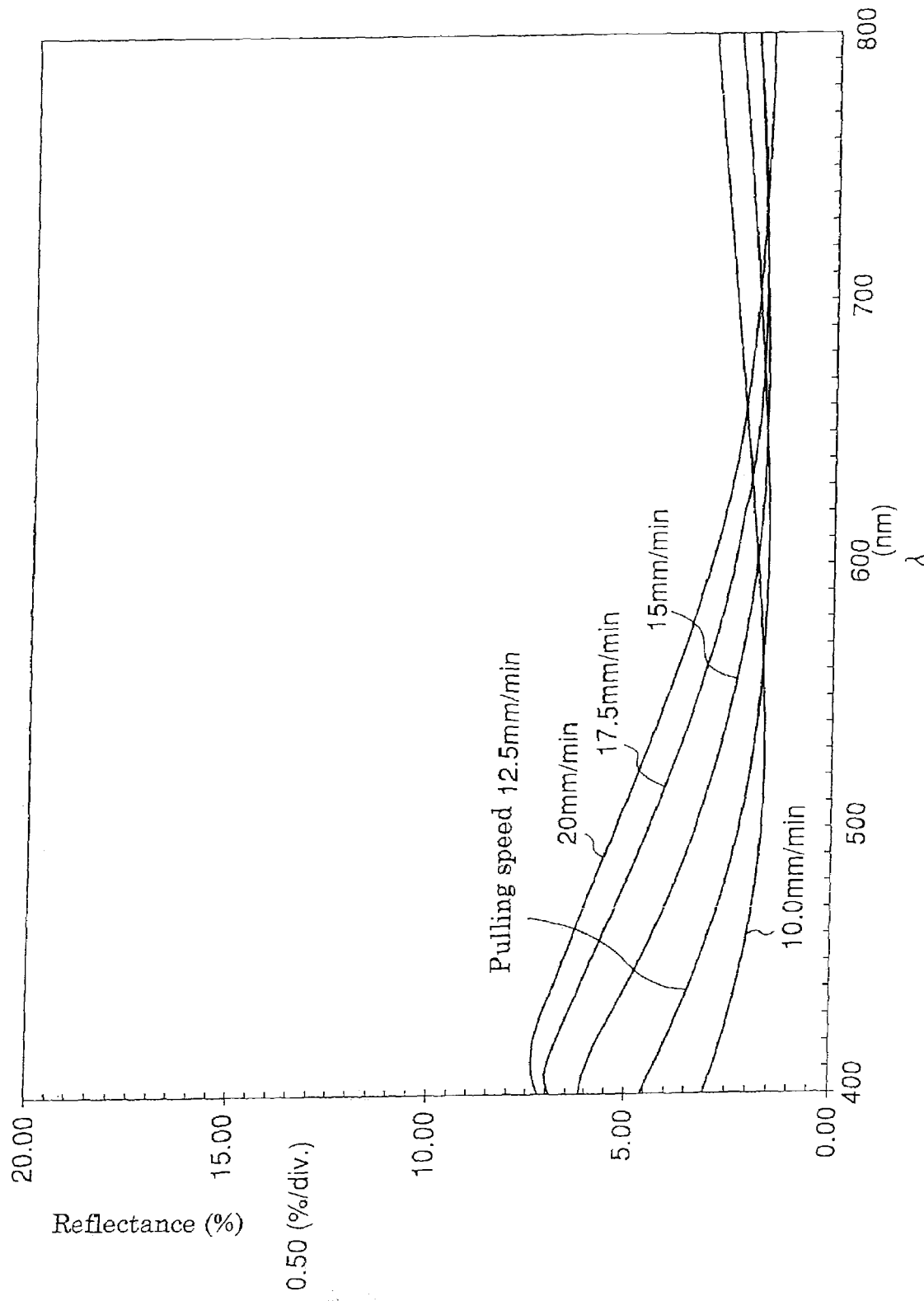
FIG. 3 shows the change in reflectance of the antireflection film when the pulling speed is changed.

In FIG. 3, the change in reflectance to the wavelength band of light from 400 nm to 800 nm of the formed antireflection film, when the pulling speed is changed, is shown in detail. In this experiment, a monitor glass substrate with a refractive index of 1.50 of the same quality as a quartz optical fiber is used.

As is apparent also from FIG. 3, when the pulling speed is changed from 20.0 mm/min to 10.0 mm/min, the reflection reducing wavelength band is changed from the relation showing the minimum reflectance (maximum transmittance) in the vicinity of 760 nm to the relation showing the minimum reflectance (maximum transmittance) in the vicinity of 530 nm.

When the pulling speed is set to a further low speed, the reflectance can be changed to change the reflection reducing wavelength range to a short wavelength band.

For example, in case of a quartz bundle fiber, the reflectance is 7% in double reflection when no antireflection film (AR coat) is formed, but it can be suppressed to the minimum reflectance in double reflection when the antireflection film (AR coat) is formed.

Figure 4:
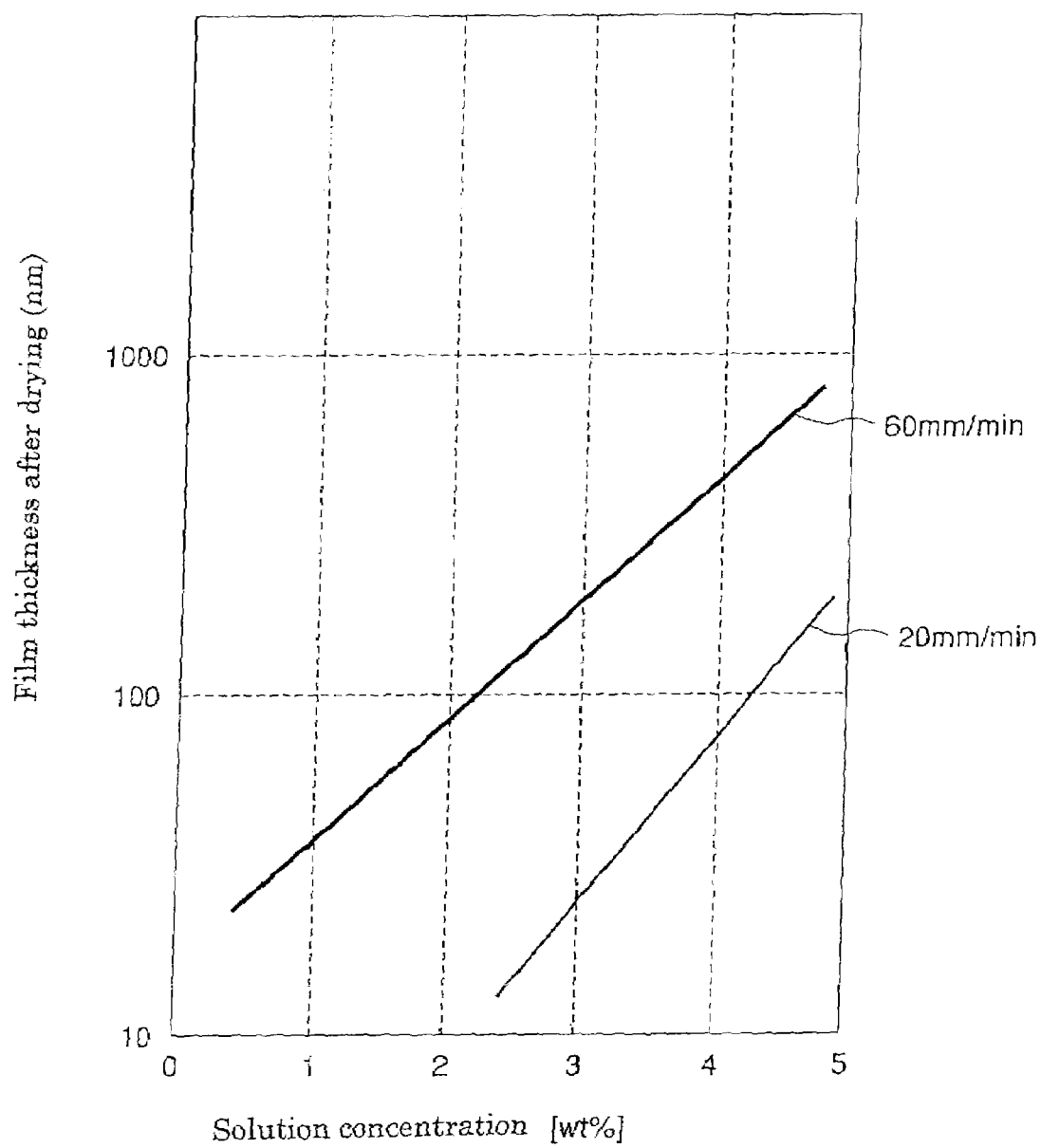
FIG. 4 shows the relation between the coating solution and the film thickness.

For the relation between the coating solution and the film thickness, as shown in FIG. 4, when the pulling speeds are 20.0 mm/min and 60.0 mm/min, the larger: the concentration of the coating solution is, the larger the film thickness is, and the both are substantially in a proportional relation.

The reflection reducing wavelength band can be changed also by changing the concentration of the coating solution.

In the above embodiment, the forming method of a single-layer-antireflection film of a fluorine-based inorganic silicon compound was described, but in the forming method of a multiplayer antireflection film having a high refractive index material laminated together, the reflectance can be reduced to 0 at the minimum.

The embodiment in which the antireflection film (AR coat) is formed on the end surface of one optical fiber by physical adsorption by dipping method was described above. However, the present invention is not limited by this, and a method for treating a number of optical fibers in large quantities may be adapted.

What is claimed is:

1. A method for forming an antireflection film on an optical fiber, comprising the steps of:
    dipping an optical fiber in a coating solution having a film forming material dissolved therein; and
    forming an antireflection film on an end surface of the optical fiber,
    wherein the end surface of the optical fiber is inclined at substantially 90° with respect to a level of the coating solution, when the dipped optical fiber is pulled up from the coating solution so as to produce a desired reflectance reducing waveband and reflectance.

2. The method according to claim 1,
    wherein the pulling speed is set, when the optical fiber is pulled up from the coating solution, to adjust the reflection reducing wavelength band of the antireflection film to be formed on the end surface of the optical fiber.

3. The method according to claim 1,
    wherein the pulling speed is set, when the optical fiber is pulled up from the coating solution, to adjust the reflectance of the antireflection film to be formed on the end surface of the optical fiber.

* * * * *